(12) United States Patent
Dannoux et al.

(10) Patent No.: US 8,043,571 B2
(45) Date of Patent: Oct. 25, 2011

(54) MICROCHANNEL REACTORS

(75) Inventors: Thierry Luc Alain Dannoux, Avon (FR); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 180 days.

(21) Appl. No.: 12/634,833

(22) Filed: Dec. 10, 2009

(65) Prior Publication Data

US 2010/0158763 A1  Jun. 24, 2010

(30) Foreign Application Priority Data

Dec. 23, 2008 (EP) .................................... 08306012

(51) Int. Cl.
*B01J 19/00* (2006.01)
*B01J 10/00* (2006.01)
*B01J 3/00* (2006.01)

(52) U.S. Cl. ........ 422/130; 422/129; 422/500; 422/501; 422/502; 422/651; 422/659; 422/198; 422/600; 422/603

(58) Field of Classification Search .................. 422/129, 422/130, 500–502, 600, 606, 650, 651, 659, 422/198, 603
See application file for complete search history.

(56) References Cited

U.S. PATENT DOCUMENTS

| | | | |
|---|---|---|---|
| 6,622,746 B2 * | 9/2003 | Yang et al. ........................ 137/4 |
| 7,032,894 B2 | 4/2006 | Adusei et al. .................... 261/97 |
| 7,241,423 B2 | 7/2007 | Golbig et al. ................. 422/130 |
| 7,247,276 B2 | 7/2007 | Schuppich et al. ........... 422/129 |
| 2004/0034266 A1 | 2/2004 | Brophy et al. ................. 585/658 |
| 2004/0109798 A1 | 6/2004 | Chopard et al. .............. 422/198 |
| 2004/0247501 A1 | 12/2004 | Adusei et al. ................. 422/211 |
| 2005/0005521 A1 | 1/2005 | Kaye et al. ...................... 48/215 |
| 2006/0102519 A1 | 5/2006 | Tonkovich et al. ........... 208/107 |
| 2006/0159600 A1 | 7/2006 | Chopard ....................... 422/195 |
| 2006/0165570 A1 | 7/2006 | Knopf et al. .................. 422/224 |
| 2008/0165616 A1 * | 7/2008 | Schubert et al. .............. 366/145 |

FOREIGN PATENT DOCUMENTS

| WO | WO 03/076065 | * | 9/2003 |
|---|---|---|---|
| WO | WO 2008/145683 | * | 12/2008 |

OTHER PUBLICATIONS

Dautzenberg, et al, "Process Intensification Using Multifunctional Reactors" chemical Engineering Science 56 (2001) pp. 251-267.

* cited by examiner

*Primary Examiner* — Walter Griffin
*Assistant Examiner* — Natasha Young
(74) *Attorney, Agent, or Firm* — Gregory V. Bean

(57) ABSTRACT

Embodiments of a microchannel reactor comprise a microchannel housing comprising a plurality of channels and an upper microstructure disposed above the microchannel housing. The upper microstructure comprising a gas feed circuit, a liquid feed circuit, and at least one mixing cavity. The mixing cavity is in fluid communication with at least one reactive passage of the microchannel housing. The gas feed circuit comprises at least one gas feed inlet, and the liquid feed circuit comprises at least one liquid feed inlet and at least one liquid reservoir adjacent to the mixing cavity, wherein the liquid reservoir is operable to deliver a liquid feed into the mixing cavity.

21 Claims, 6 Drawing Sheets

MICROCHANNEL REACTORS

PRIORITY

This application claims priority to European Patent Application number 08306012.9, filed Dec. 23, 2008, titled "Microchannel Reactors".

BACKGROUND

The present disclosure is generally directed to microchannel reactors, and, more specifically, to microchannel reactors arranged for gravity assisted flow and comprising flame barrier inserts which allow processing of highly exothermic reactions.

SUMMARY

Microreactors, which are commonly referred to as micro structured reactors, microchannel reactors, microcircuit reactors, or microfluidic devices, is a device in which a sample can be confined and subject to processing. The sample can be moving or static, although it is typically a moving sample. In some cases, the processing involves the analysis of chemical reactions. In others, the processing is executed as part of a manufacturing process utilizing two distinct reactants. In still others, a moving or static target sample is confined in a micro-reactor as heat is exchanged between the sample and an associated heat exchange fluid. In any case, the dimensions of the confined spaces may be on the order of about 1 mm. Microchannels are the most typical form of such confinement and the micro-reactor is usually a continuous flow reactor, as opposed to a batch reactor. The internal dimensions of the microchannels provide considerable improvement in mass and heat transfer rates. Micro-reactors that employ microchannels offer many advantages over conventional scale reactors, including vast improvements in energy efficiency, reaction speed, reaction yield, safety, reliability, scalability, etc.

Despite these advantages, some reaction conditions pose challenges for microreactors. For instance, highly exothermic reactions can be processed only in conditions that control temperature elevation. For example, ozonolysis is known as a highly explosive reaction, thus microreactors may utilize low reaction volumes and confinement means inside the microreactor to prevent flame propagation. Another issue is two-phase flow, such as Gas/Liquid flow, which can cause unacceptably high pressure drop within a reactor.

The present invention relates to micro-reactors, specifically micro-reactors arranged for gravity-assisted flow or falling film micro-reactors which are particularly advantageous for hazardous reactions such as ozonolysis reactions. Moreover, the micro-reactors are able to handle two-phase (gas/liquid) flow without unacceptable pressure drop inside the reactor.

According to one embodiment of the present disclosure, a microchannel reactor is provided. The microchannel reactor comprises a microchannel housing comprising a plurality of channels positioned for gravity-assisted flow and an upper microstructure disposed above the microchannel housing. The upper microstructure comprises a gas feed circuit, a liquid feed circuit, and at least one mixing cavity. The microchannel housing comprises at least one reactive passage, and the mixing cavity is in fluid communication with the reactive passage. The gas feed circuit comprises at least one gas feed inlet operable to deliver a gas feed to the mixing cavity. The liquid feed circuit comprises at least one liquid feed inlet and at least one liquid reservoir adjacent to the mixing cavity, wherein the liquid feed is in fluid communication with the at least one liquid feed inlet. The liquid reservoir is operable to deliver a liquid feed into the mixing cavity.

In further embodiments, the mixing cavity may comprise flame barrier insert, which may prevent flame propagation in hazardous reactions such as ozonolysis.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
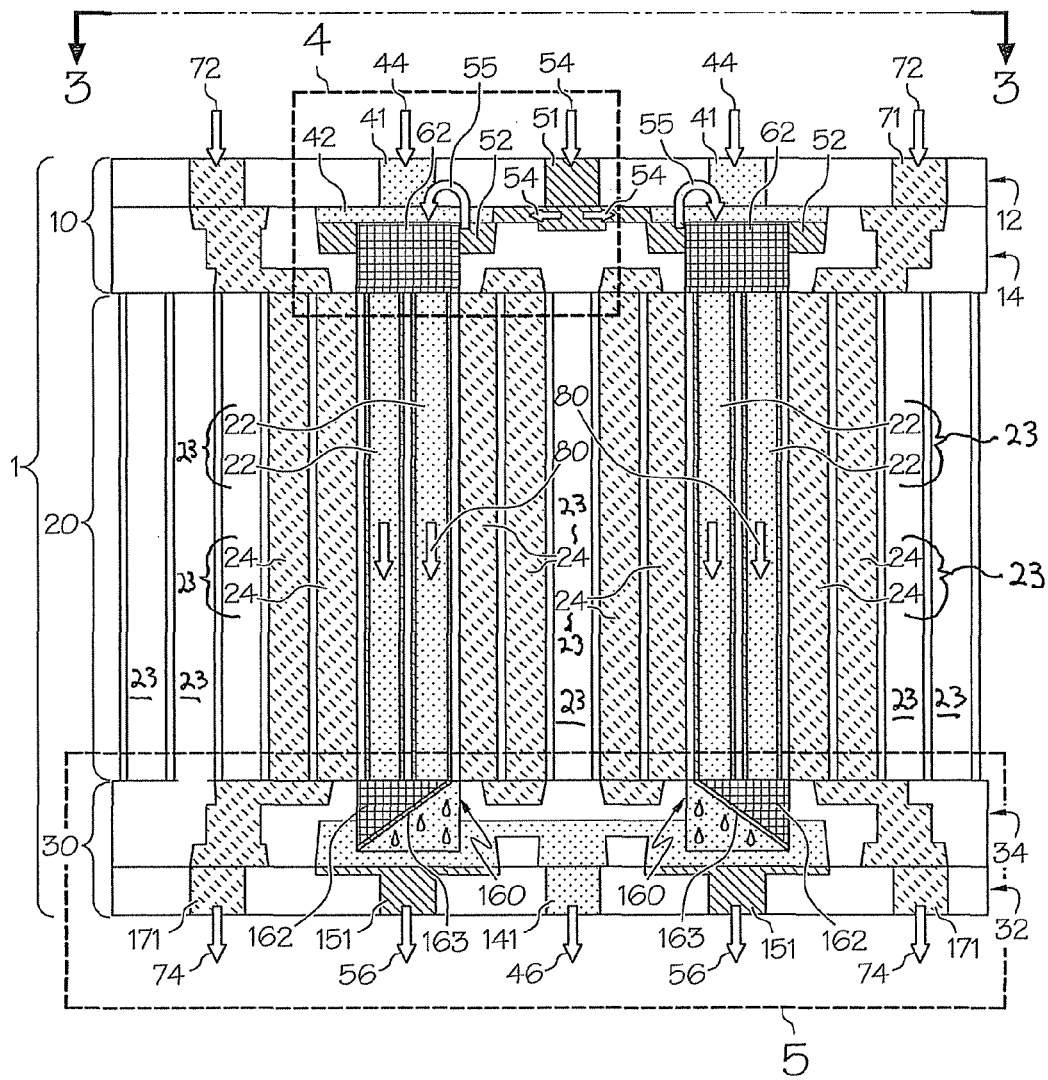
FIG. 1 is a side cross-sectional view of the microchannel reactors according to one more embodiments of the present invention.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

Figure 3:
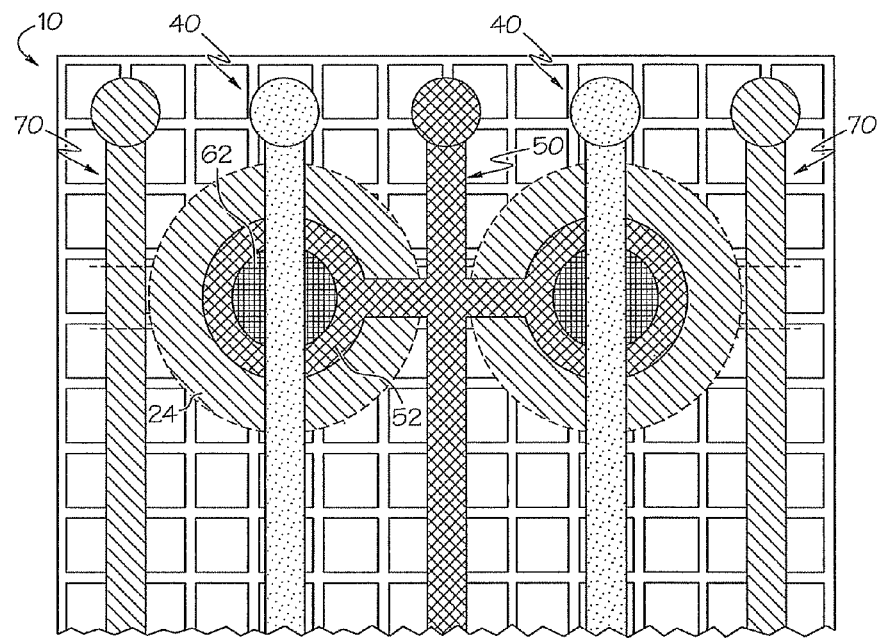
FIG. 3 is a partial top cross-sectional view of the microchannel reactor of FIG. 1, specifically illustrating the liquid circuit, the gas circuit, the cooling circuit, two mixing cavities of the upper microstructure, and the reactive and cooling channels of the microchannel housing according to one more embodiments of the present invention.

Referring to FIG. 1, the microchannel reactor 1, which may also be called a falling film reactor, comprises a microchannel housing 20, and an upper microstructure 10 disposed above the microchannel housing 20. As shown in FIG. 3, the microchannel housing 20 may comprise a rectangular shape; however, other types of housings 20, for example, a cylindrical housing, are contemplated herein. Referring to FIG. 1, the microchannel housing 20 may comprise a plurality of open ended channels 23, e.g., microchannels having a diameter of less than 1 mm. As shown in FIG. 1, the open ended channels 23 are straight channels disposed parallel to one another; however, it is contemplated that curved or circuitous channels disposed in a non-parallel configuration may be desirable in some industrial applications. Like the microchannel housing 20, the channels 23 may comprise various thicknesses and shapes. For example, the channels 23 may comprise circular cylindrical, triangular, hexagonal, or rectangular channels. The housing 20 is desirably so positioned that the channels 23 arranged therein are positioned for gravity-assisted flow, that is, the channels are non-horizontal and desirably are positioned within 45 degrees or less of vertical, up to and including vertical orientation.

Among the many channels 23 in the microchannel housing 20, the microchannel housing 20 may comprise at least one reactive passage 22 as shown in FIG. 1. As shown in the embodiment of FIG. 1, the reactive passage 22 may comprise two or more adjacent channels inside the microchannel housing 20. As will be described in detail below, the reactive passage 22 is configured for the mixing of falling gas and liquid feeds. While various shapes and configurations are contemplated for the reactive passage 22, the reactive passage 22 may, in the embodiment of FIG. 3 comprise a cylindrical passage disposed below the flame barrier insert 62. The mixing cavity 60 and flame barrier insert 62 therein will be described in detail below.

Referring again to FIG. 1, the microchannel housing 20 further comprises at least one coolant passage 24 disposed adjacent the reactive passage 22. By disposing the coolant passage 24 adjacent the reactive passage 22, the coolant passage 24 may act as a heat exchanger for the reactive passage 22. As a result, the coolant passage 24 may be beneficial for reactions that require temperature control inside the reactor 1; however, it is not required for all reactions. Like the reactive passage 22, the coolant passage 24 may comprise one or more of channels 23 of the microchannel housing 20. Moreover, the coolant passage 24 may define multiple shapes as desirable based on the industrial application. Referring to the embodiment of FIGS. 1 and 3, the coolant passage 24 may define a ring which coaxially surrounds a cylindrical reactive passage 22.

While the present disclosure describes both the reactive passage 22 and the coolant passage 24 as occupying one or more channels 23 of the microchannel housing 20, this is not the only foreseeable embodiment for the reactant and coolant passages. For example, the reactant passage 22 and coolant passage 24 may comprise their own formed structures separate from the channels 23 of the microchannel housing 20.

Figure 2:
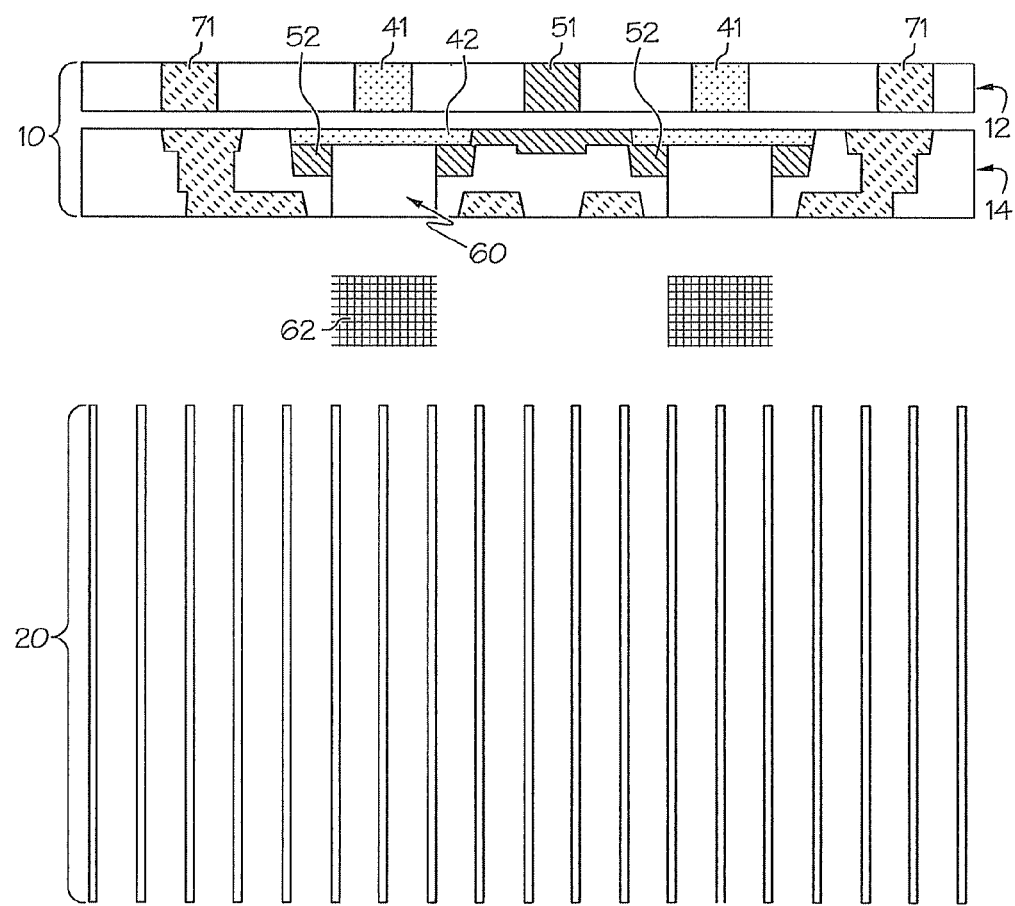
FIG. 2 is an exploded side cross-sectional view illustrating the upper microstructure of the microchannel reactors according to one more embodiments of the present invention.

Referring again to FIG. 1, the upper microstructure 10 of the microchannel reactor 1 may comprise one layer or may define a multilayer structure. As shown in the embodiment of FIGS. 1 and 2, the upper microstructure 10 may comprise a first plate 12 and a second plate 14 disposed between the first plate 12 and the microchannel housing 20. The upper microstructure 10 is directed to delivering and controlling a liquid feed 54, a gas feed 44, and optionally a coolant feed 71 into the microchannel housing 20. Referring generally to the embodiments of FIGS. 1 and 6, the upper microstructure 10 may comprise a gas feed circuit 40, a liquid feed circuit 50, and optionally a coolant feed circuit 70. As used herein, "circuit" may include various components of the upper microstructure 10 configured to deliver reactants to the microchannel housing 10, for example, inlet tubes, reservoirs, receptacles, channels Referring again to FIG. 2, the upper microstructure 10 may also comprise at least one mixing cavity 60 in fluid communication with the reactive passage 22 of the microchannel housing 20. As shown, the mixing cavity 60 may be an open ended structure disposed in the upper microstructure 10. For example, the mixing cavity 60 may be disposed inside the second plate 14 of the upper microstructure 10 as shown in FIG. 2. As will be described below, the mixing cavity 60 may be utilized as a mixing location for the gas feed 44 and liquid feed 54 from the gas and liquid inlets 41, 51, respectively.

Figure 4:
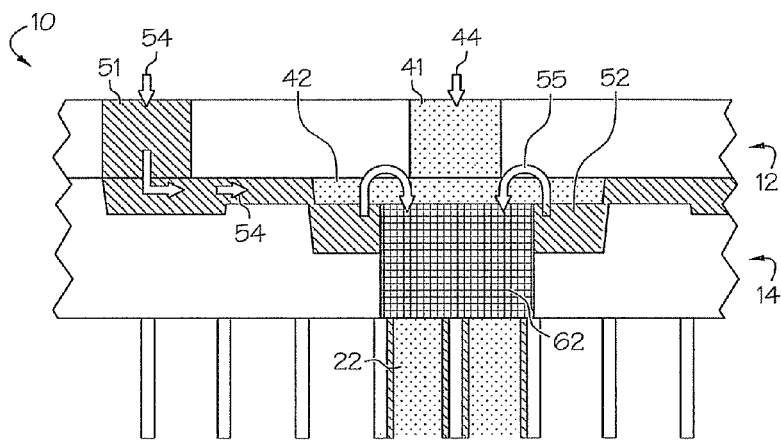
FIG. 4 is a partial side cross-sectional view of the microchannel reactor of FIG. 1, specifically illustrating the overflow feed of liquid from the liquid circuit into the mixing cavity of the upper microstructure according to one more embodiments of the present invention.
Figure 6:
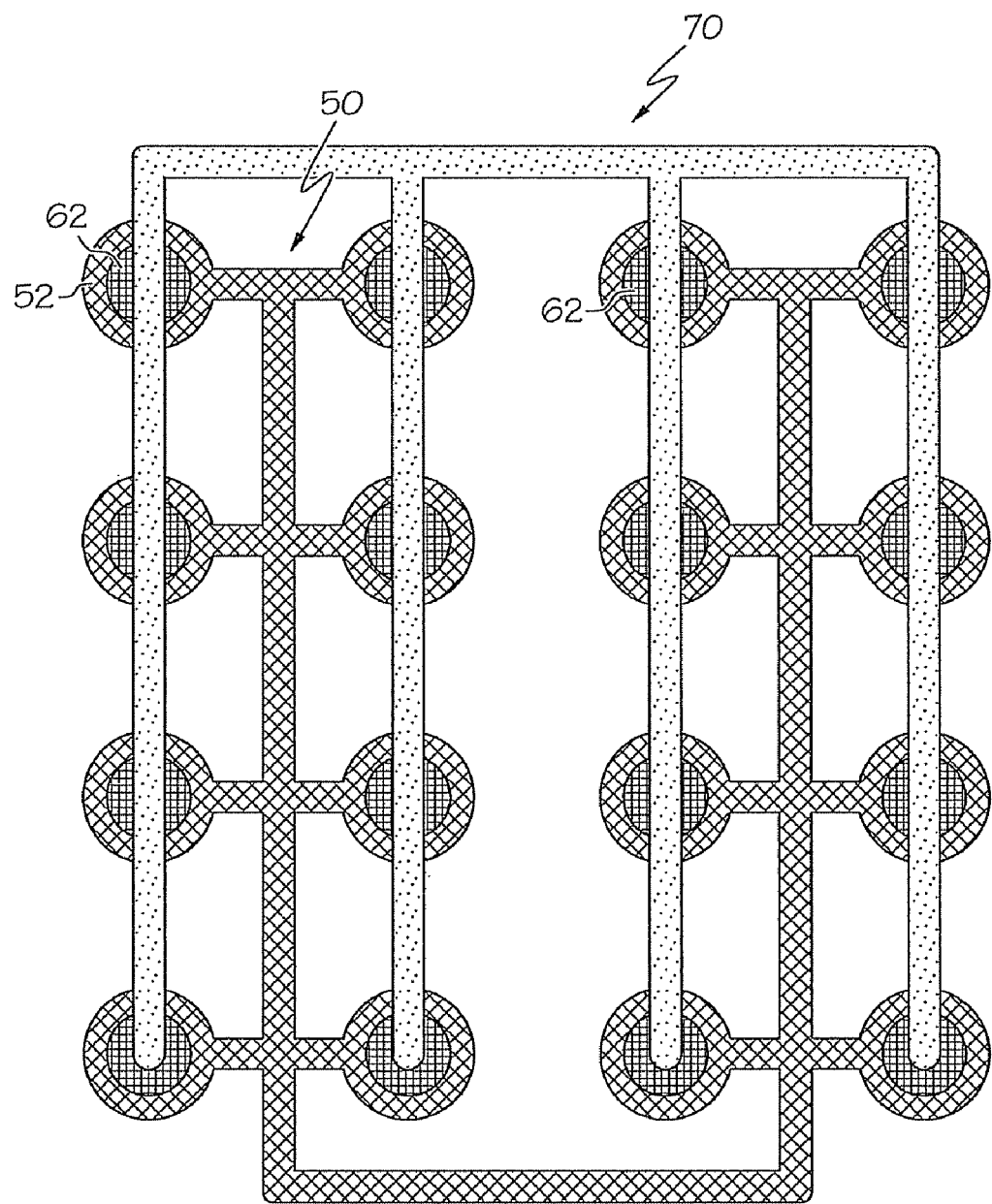
FIG. 6 is a schematic view of the liquid and gas circuits for a microchannel reactor comprising 16 mixing cavities.

As shown in FIGS. 1, 4, and 6, the gas feed circuit 40 comprises at least one gas feed inlet 41, and may also comprise at least one gas reservoir 42 in fluid communication with the gas feed inlet 41. The gas feed inlet 41 is configured to provide a gas feed to the mixing cavity 60. In an alternative embodiment, the gas feed may be delivered to gas reservoir 42 before delivery to the mixing cavity 60. As shown in the embodiment of FIG. 1, the gas feed inlet 41 may be disposed in the first plate 12, and the gas reservoir 42 may be in the second plate 14 at a position below the gas feed inlet 41. While not shown, various delivery devices configured to couple with and deliver a gas feed 44 to the gas feed inlet 41 are contemplated herein. Moreover as described above, various gas feed 44 compositions may be suitable.

Referring again to FIGS. 1, 4, and 6, the liquid feed circuit 50 may comprises at least one liquid inlet 51 and at least one liquid reservoir 52 in fluid communication with the liquid feed inlet 51. As shown in FIG. 2, the liquid reservoir 52 is adjacent to the mixing cavity 60, and in further embodiments, may be disposed below the gas reservoir 42. As shown in FIGS. 1 and 4, the liquid reservoir 52 is operable to deliver a liquid feed 55 into the mixing cavity 60. While the present disclosure highlights the delivery of the feed 55 into the mixing cavity 60, it is contemplated that at least a portion of the liquid feed 44 may bypass the mixing cavity 60 and be fed directly into the reactive passage 22. It is further contemplated that at least a portion of the feed 55 of liquid may travel through the gas reservoir 42 prior to entering the mixing cavity 60.

In further embodiments as shown in FIG. 2, the mixing cavity 60 may comprise at least one flame barrier insert 62 disposed inside the mixing cavity 60. The flame barrier insert 62 is directed to prevent hazardous flame propagation from passing to the gas feed circuit 40 or the liquid feed circuit 50. As described above, reactions inside the reactive passage 22, like ozonolysis, are highly flammable, thus it is desirable to prevent the flames from escaping the microchannel reactor 1 through the gas inlet 41 or liquid inlet 51. While various materials are suitable to prevent flame propagation, the flame barrier insert 62 may comprise materials, such as porous glass (e.g., borosilicate glass) or porous ceramic or glass-ceramic, or fibrous materials such as carbon fiber, all of which allow liquid or gas flow into the reactive passage 22. The borosilicate glass may be Pyrex® 7761 (potash borosilicate crushed/powdered glass) produced by Corning Inc. The ceramic may be alumina or Celcor®, a cordierite material for honeycomb structures used commercially as a substrate for automotive catalytic converters. As would be familiar to one of ordinary skill in the art, the porous glass or ceramic may undergo other processing steps before use in the microreactor 1, for example, redrawing. In one exemplary embodiment, a Celcor material may be redrawn at 860° C. under a 450 g pulling force and a 20 mbar internal pressure in order to prevent cell collapse. Other silica glass materials and other ceramics are also contemplated herein. The porosity may be varied depending on the industrial application. In one embodiment, the flame barrier insert 62 may comprise capillaries or pores having a diameter generally in the range of 50 to 300 µm, desirably of less than 100 µm.

Figure 5:
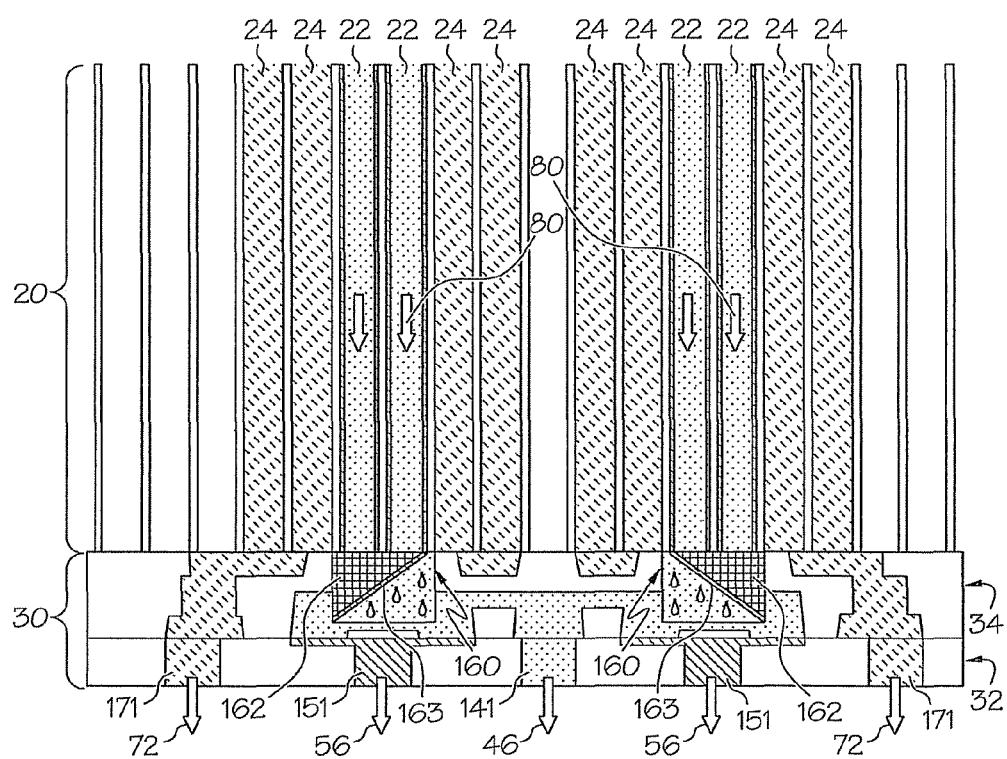
FIG. 5 is a partial side cross-sectional view of the microchannel reactor of FIG. 1, specifically illustrating the lower microstructure according to one more embodiments of the present invention.

Referring to FIGS. 1 and 5, the microchannel reactor 1 may also comprise a lower microstructure 30 disposed below the microchannel housing 20. Like the upper microstructure 10, the lower microstructure 30 may comprise a one layer structure or a multi-layer structure. Referring to FIGS. 1 and 5, the lower microstructure 30 may comprise a third plate 32 disposed at the bottom of the lower microstructure 30, and a fourth plate 34 disposed between the third plate 32 and the microchannel housing 20. While the lower microstructure 30 is similar to the upper microstructure 10, it is further configured to separate the falling gas/liquid mixture 80, which reacts inside the reactive passage 22 of the microchannel housing 20. To that end, the lower microstructure 30 comprises a separating cavity 160 in fluid communication with the reactive passage 22, i.e., the reacted gas and liquid 80 from the reactive passage 22 is delivered to the separating cavity 160. Referring to FIGS. 1 and 5, the separating cavity 160 may be disposed inside the fourth plate 34. The gas and liquid mixture 80 may be separated by the separating cavity 160 using gravitational separation, or other suitable methods familiar to one of ordinary skill in the art.

Similar to the mixing cavity 60 of the upper microstructure 10, the separating cavity 160 of the lower microstructure 30 comprises a flame barrier insert 162 configured to prevent flames from escaping though the lower microstructure 30. While the flame barrier insert 162 of the separating cavity 160 is structurally and compositionally similar to the flame barrier insert 62 of the mixing cavity 60, the flame barrier insert 162 of the separating cavity 160 may also be used as a separator means. As shown in FIGS. 1 and 5, the flame barrier insert 162 may be beveled at an angle (see slanted edge 163) to allow the liquid to collect at a preferred extremity of the flame barrier insert 162, thereby facilitating improved separation of gas and liquid. In one or more embodiments, the angle may be between about 30 to about 60°, or about 45°.

Referring again to FIGS. 1 and 5, the lower microstructure 30 comprises at least one gas outlet 141 and at least one liquid outlet 151, which are both in fluid communication with the separating cavity 160 i.e., the gas outlet 141 and the liquid outlet 151 receive and output separated gas and liquid from the separating cavity 160. As shown in the gravitational separation embodiment of FIGS. 1 and 5, the liquid outlet 151 is disposed below the separating cavity 160, whereas the gas outlet 141 is vertically offset from the separating cavity 160. The lower microstructure 30 may also comprise a coolant outlet 171, which may comprise a similar structure as the coolant inlet 71 in the upper microstructure 10.

Figure 7:
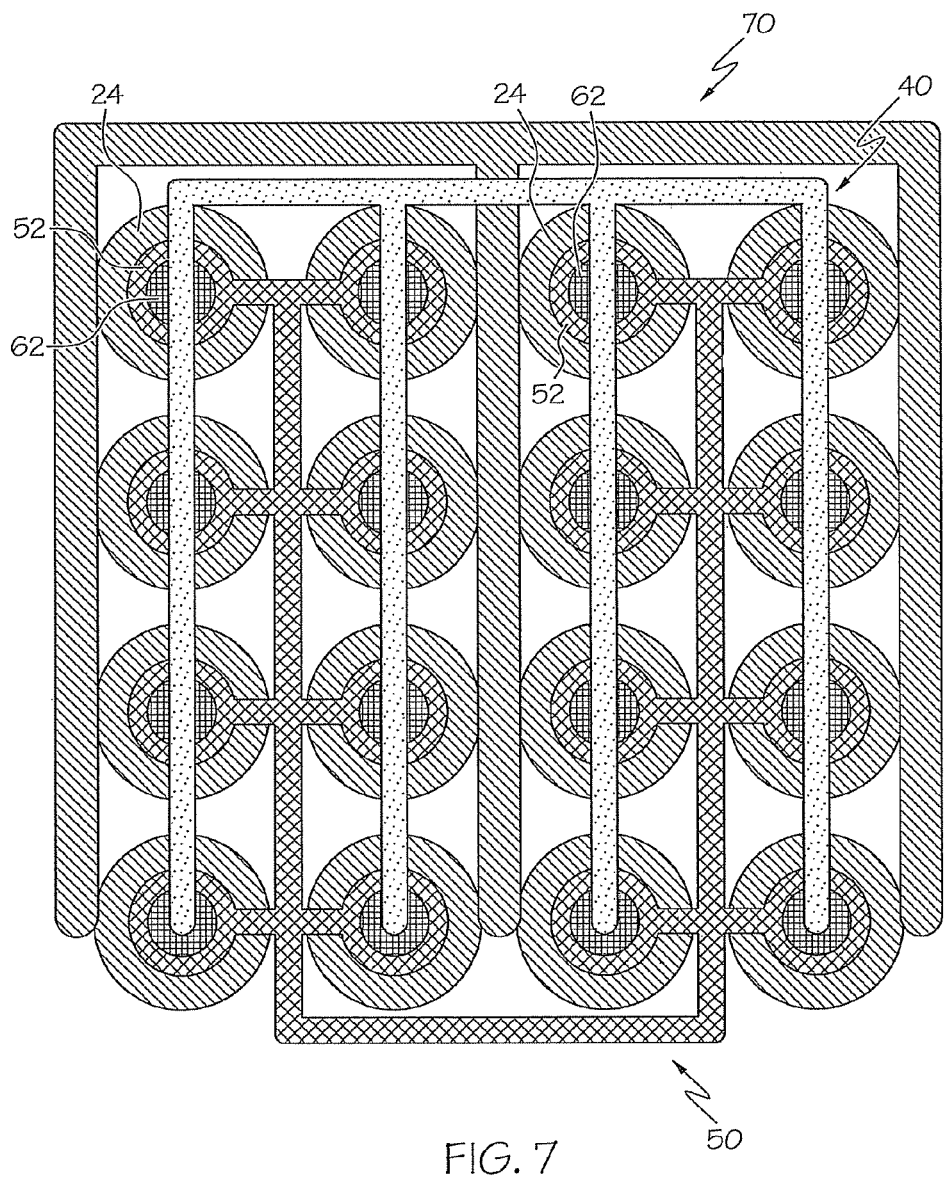
FIG. 7 is a schematic view of the liquid, gas, and cooling circuits for a microchannel reactor comprising 16 mixing cavities.

While the embodiments of FIGS. 1-5 are directed to embodiments comprising one or two reactive passages 22 or mixing cavities 60, the microchannel reactor 1 may include hundreds or thousands of reactive passages 22. Referring to the embodiments of FIGS. 6 and 7, the microchannel reactor 1 may comprise liquid circuits 50, gas circuits 40, and cooling circuits 70 operable to feed sixteen (16) reactive passages 22 and mixing cavities 60.

In operation as shown in FIG. 1, a liquid feed 54 is delivered into the liquid inlet 51 of the upper microstructure 10, and the gas feed 44 is delivered into the gas feed inlet 41 of the upper microstructure 10. Subsequently, the gas feed 44 may be delivered through the gas reservoir 42 and into the flame barrier insert 62 of the mixing cavity 60. Upon being received via the liquid inlet 51, the liquid feed 54 passes into the liquid reservoir 52 adjacent the mixing cavity 60. At which point, the liquid flows into the flame barrier insert 62. For embodiments comprising a gas reservoir 42, it is contemplated that the overflow liquid feed 55 may pass through the gas reservoir 42. Upon delivery to the mixing cavity 60, the liquid and gas feeds inside the mixing cavity 60 are then delivered to the reactive passages 22. Due to the pressure provided by the flow of the gas feed 44, it is contemplated that the liquid of the gas/liquid mixture 80 will predominate towards the walls of the mixing cavity 60 and the reactive passages 22. After reaction in the reactive passages 22, the falling gas/liquid mixture 80 may then be separated by the separating cavity 160 of the lower microstructure 30. The separated gas 46 and separated liquid 56 are outputted through the gas outlet 141 and liquid outlet 151, respectively. To control the reaction temperatures, coolant 72 from the coolant inlet 71 may be delivered though the coolant passage 24 to control the temperature of the adjacent reactive passage 22.

The components of the reactor 1 may be constructed through various fabrication methods familiar to one of ordinary skill in the art, for example, extrusion, molding, redrawing or combinations thereof. The components of the reactor 1 (e.g., the lower microstructure 30, the upper microstructure 10, and the microchannel housing 20) may comprise materials such as glass, cordierite, alumina, and other ceramics or combinations thereof, which may be modified to form the channels, cavities and other structures formed therein. It is contemplated that the lower microstructure 30, the upper microstructure 10, and the microchannel housing 20 may all comprise the same material, or alternatively may comprise different materials.

After the individual components are formed, the lower microstructure 30, the upper microstructure 10, and the microchannel housing 20 may be combined using various techniques, e.g. high temperature glass bonding, glass frit sealing or combinations thereof, resulting in a high temperature glass bond, a glass frit seal, or combinations thereof in the resulting microchannel reactor 1. In one exemplary embodiment of high temperature glass bonding, the upper microstructure 10 and lower microstructure 30 may be bonded onto the microchannel housing 20 at a temperature of about 810° C. In one exemplary embodiment of glass frit sealing, which may occur at lower temperatures than the high temperature glass bonding, the frit material may comprise any frit which matches the Pyrex 7761 or any other material used in the reactor 1 (e.g., alumina with a frit presenting a coefficient of thermal expansion (CTE) between 65 and $75 \times 10^{-7}$ $C^{-1}$).

The microchannel reactor 1 embodiments achieve numerous advantages. For example, the reactor allows mass parallel chemical reaction processing with low pressure drop and high thermal exchange efficiency. The microstructures of the microreactor provide excellent flow control and enable easier arrangement of reactors in series and/or parallel. In addition to flow control and distribution, the upper microstructure enables the reactor to function in multiple flow regimes. For example, it is possible to run the reactor in a Taylor flow mode (gas bubbles/train of liquid slugs sequences), in a Falling Film mode (annular gas core and liquid wetting the channel surfaces), as well as other complex flow patterns and regimes. Further as stated above, the flame barrier inserts enable the microreactor to operate under hazardous reaction conditions. Ozonolysis is an example of a chemical reaction wherein flame propagation is common; however, it is understood that the reactor is not limited to this application.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue. Moreover, although the term "at least" is utilized to define several components of the present invention, components which do not utilize this term are not limited to a single element.

To the extent that any meaning or definition of a term in this written document conflicts with any meaning or definition of the team in a document incorporated by reference, the meaning or definition assigned to the term in this written document shall govern.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A microchannel reactor comprising a microchannel housing comprising a plurality of channels positioned for gravity-assisted feed, and an upper microstructure disposed above the microchannel housing, the upper microstructure comprising a gas feed circuit, a liquid feed circuit, and at least one mixing cavity wherein:
    the microchannel housing comprises at least one reactive passage;
    the mixing cavity is in fluid communication with the reactive passage;
    the gas feed circuit comprises at least one gas feed inlet operable to deliver a gas feed to the mixing cavity; and
    the liquid feed circuit comprises at least one liquid feed inlet and at least one liquid reservoir adjacent to the mixing cavity and in fluid communication with the at least one liquid feed inlet, wherein the liquid reservoir is operable to deliver a liquid feed into the mixing cavity.

2. The microchannel reactor of claim 1 wherein the gas feed circuit comprises at least one gas reservoir in fluid communication with the gas feed inlet, the gas reservoir being disposed above the mixing cavity and is configured to deliver a gas feed from the gas feed inlet to the mixing cavity.

3. The microchannel reactor according to claim 1 wherein the upper microstructure comprises a cooling circuit.

4. The microchannel reactor according to claim 1 wherein the reactant passage comprises at least one of the channels of the microchannel housing.

5. The microchannel reactor of claim 4 wherein the microchannel housing further comprises at least one coolant passage disposed adjacent the reactive passage and in fluid communication with the cooling circuit, wherein the coolant passage comprises at least one of the channels of the microchannel housing.

6. The microchannel reactor according to claim 1 wherein the liquid reservoir is configured to deliver at least a portion of a liquid feed through the gas reservoir prior to delivery to the mixing cavity.

7. The microchannel reactor according to claim 1 wherein the mixing cavity comprises a flame barrier insert disposed inside the mixing cavity.

8. The microchannel reactor according to claim 7 wherein the flame barrier insert is a porous glass, glass-ceramic, or ceramic.

9. The microchannel reactor according to claim 7 wherein the flame barrier insert comprises borosilicate glass, cordierite, alumina, or combinations thereof.

10. The microchannel reactor according to claim 7 wherein the flame barrier insert comprises a fibrous material.

11. The microchannel reactor according to claim 7 wherein the flame barrier insert comprises capillaries or pores having a diameter in the range of 50-300 µm.

12. The microchannel reactor according to claim 7 wherein the flame barrier insert comprises capillaries or pores having a diameter of less than 100 µm.

13. The microchannel reactor according to claim 1 wherein the upper microstructure comprises a first plate and a second plate disposed between the first plate and the microchannel housing.

14. The microchannel reactor according to claim 13 wherein the mixing cavity is disposed in the second plate.

15. The microchannel reactor according to claim 1 further comprising a lower microstructure disposed below the microchannel housing, wherein the lower microstructure comprises a separating cavity in communication with the reactive passage.

16. The microchannel reactor according to claim 15 wherein the separating cavity comprises a flame barrier insert.

17. The microchannel reactor according to claim 16 wherein the flame barrier insert is beveled at an angle for separation of gas and liquid.

18. The microchannel reactor according to claim 17 wherein the angle is between about 30° to about 60°.

19. The microchannel reactor according to claim 15 wherein the lower microstructure comprises at least one gas outlet and at least one liquid outlet, the gas outlet and the liquid outlet being in fluid communication with the separating cavity such that the gas outlet is operable to receive a separated gas from the separating cavity and the liquid outlet is operable to receive a separated liquid from the separating cavity.

20. The microchannel reactor according to claim 15 wherein the lower microstructure, the upper microstructure, and the microchannel housing comprise glass, cordierite, or combinations thereof.

21. The microchannel reactor according to claim 15 wherein the lower microstructure, the upper microstructure, and the microchannel housing are fused by means of a high temperature glass bond, a glass frit seal, or combinations thereof.

* * * * *